United States Patent Office.

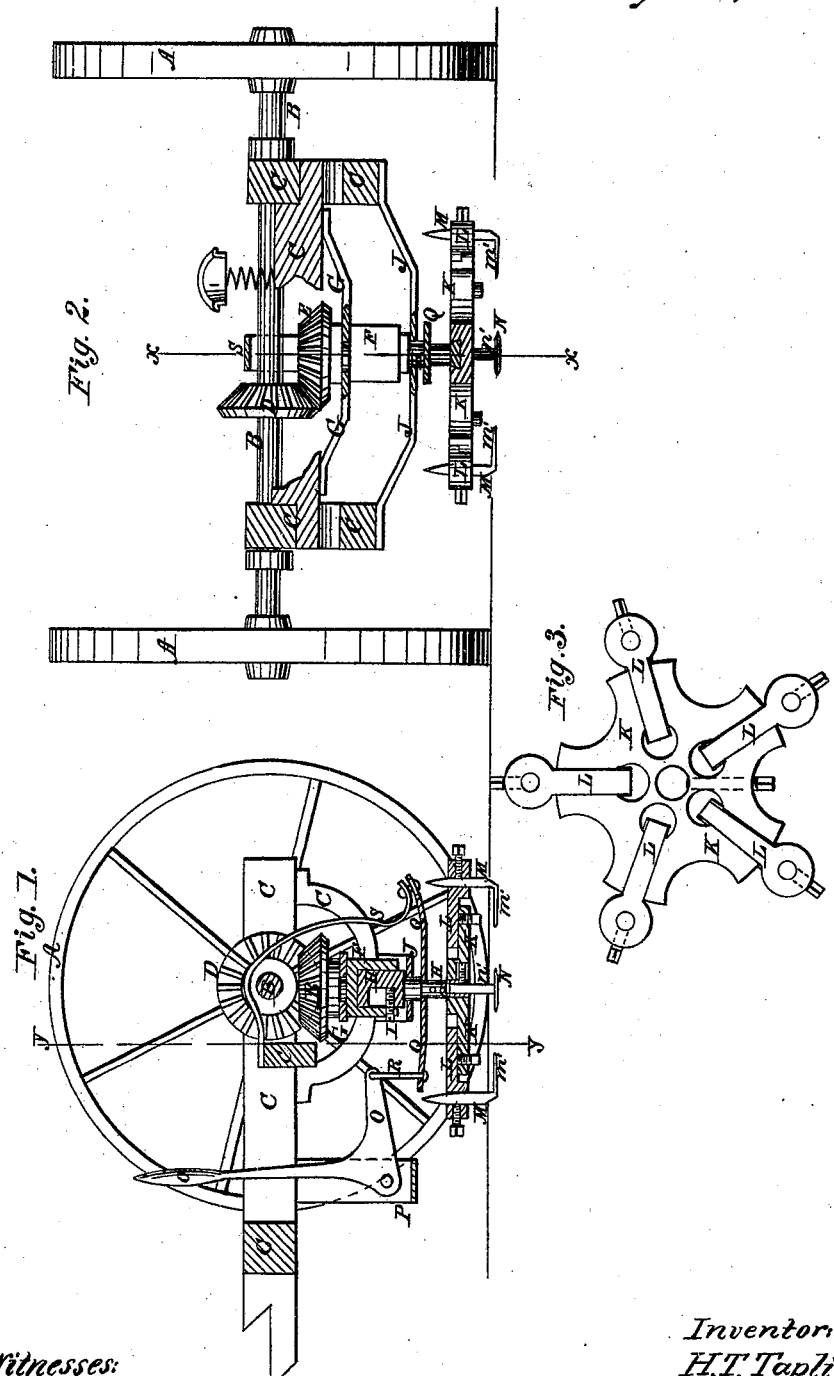

HENRY T. TAPLIN, OF SOUTH NEW MARKET, NEW HAMPSHIRE.

Letters Patent No. 95,394, dated September 28, 1869.

---

IMPROVEMENT IN COMBINED ROTARY CULTIVATOR AND HARROW.

---

The Schedule referred to in these Letters Patent and making part of the same.

---

*To all whom it may concern:*

Be it known that I, HENRY T. TAPLIN, of South New Market, in the county of Rockingham, and State of New Hampshire, have invented a new and useful Improvement in Combined Rotary Cultivator and Harrow; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved machine, taken through the line x x, fig. 2.

Figure 2 is a vertical cross-section of the same, taken through the line y y, fig. 1.

Figure 3 is a detail top view of the revolving plate that carries the cultivator and harrow-teeth.

Similar letters of reference indicate corresponding parts.

My invention has for its object to furnish an improved machine for stirring the ground and destroying the grass and weeds between the rows of plants, which shall be simple in construction and effective in operation; and It consists in the construction and combination of the various parts of the machine, as hereinafter more fully described.

A are the wheels, which are securely attached to the axle B, so as to carry the said axle with them in their revolution.

The axle B revolves in bearings attached to the frame C, with which the other parts of the machine are connected.

To the axle B is attached a bevel-gear wheel, D, the teeth of which mesh into the teeth of the bevel-gear wheel E, attached to the upper end of the vertical shaft F, which revolves in and is supported by bearings, G, connected with the frame C.

The lower part of the shaft F has a square hole or socket formed longitudinally in it to receive the square upper end of the shaft H, so as to carry the said shaft H with it in its revolution, and at the same time allow the said shaft H to be moved up and down vertically within it.

The vertical movement of the shaft H, in the shaft F, is limited, and at the same time the said shaft H is kept from dropping out of the said shaft F, by the stop-pin I, which is attached to the shaft F, and enters a longitudinal groove or slot in the shaft H, as shown in fig. 1.

The shaft H revolves in and at the same time is supported against side pressure by the bearings J, connected with the frame C, as shown in fig. 2.

To the lower end of the shaft H is adjustably secured by means of a set-screw, as shown in fig. 3, a plate, k, the upper side of which is grooved radially with five, more or less, dovetailed grooves to receive the inner ends of the dovetailed arms L, which are adjustably secured in place by set-screws, as shown in figs. 1 and 2.

Through the outer ends of the arms L are formed vertical holes, to receive the cutters or teeth M, where they are adjustably secured in place by set-screws, as shown in figs. 1, 2, and 3.

Upon one end of each of the teeth M is formed a cutter, m', projecting at right angles from the body of the teeth, as shown in figs. 1 and 2.

The other ends of the teeth M are pointed in the same manner as ordinary harrow-teeth, so that by simply reversing the teeth M, the machine may be used as a cultivator or harrow, as may be required.

N is a circular cutter attached to the lower end of the shank or shaft n', which enters a hole or socket formed in the lower end of the shaft H, where it is detachably secured in place by a set-screw, as shown in fig. 1.

When the machine is to be used as a harrow, the cutter N should be detached.

O is a bent lever, which is pivoted at its angle to a support, P, attached to the frame C.

One end of the lever O extends up into such a position that it may be conveniently reached and operated by the driver.

The other end of the lever O is connected with the end of the lever Q by a short connecting-link or bar, R.

The lever Q has a hole formed through it, through which the lower part of the shaft H passes, said shaft having a shoulder formed upon it to rest upon the said lever.

The other end of the lever Q is pivoted to some suitable support, as S, attached to the frame C.

By this construction, the plate k and its attachments may be conveniently raised from the ground, when desired, for passing obstructions, or other purposes.

The machines may be made small, to be operated by hand, or they may be made large, to be operated by horse-power, as may be desired.

Having thus described my invention,

I claim as new, and desire to secure by Letters Patent—

1. The combined cultivator and harrow-teeth M m', constructed substantially as herein shown and described, and for the purpose set forth.

2. The reversible teeth M and adjustable radial arms L, in combination with the revolving-plate k, substantially as herein shown and described, and for the purpose set forth.

3. The combination of the teeth M, adjustable arms L, revolving-plate k, shafts H and F, gearwheels E and D, axle B, wheels A, and frame C, with each other, substantially as herein shown and described, and for the purpose set forth.

4. The combination of the detachable circular cutter N n' with the shaft H, plate k, adjustable arms L, and teeth M, substantially as herein shown and described, and for the purpose set forth.

5. The combination of the bent lever O and lever Q with the shaft H, plate k, adjustable arms L, and teeth M, substantially as herein shown and described, and for the purpose set forth.

HENRY T. TAPLIN.

Witnesses:
L. S. PEASE,
J. C. HANSON.
FRED. CURTIS.